Figure 5:
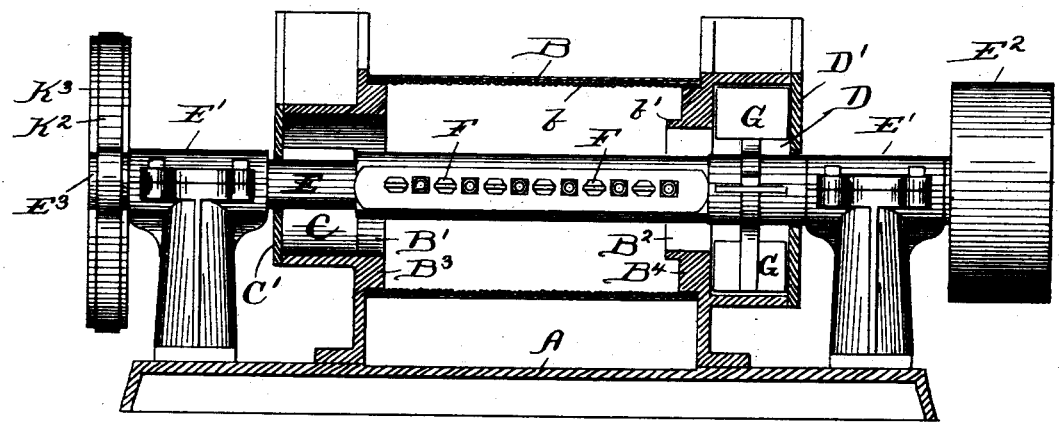

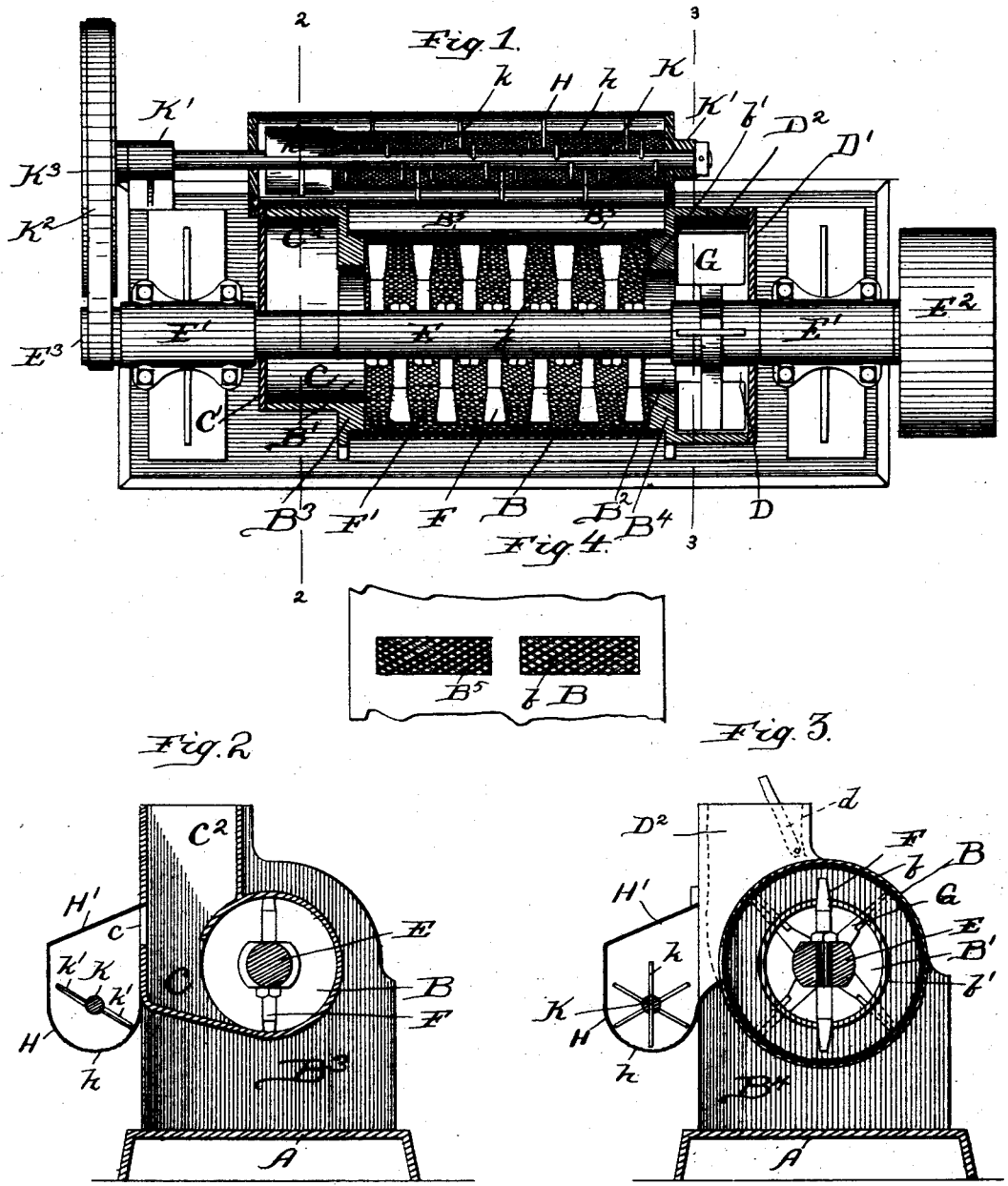

(No Model.) 2 Sheets—Sheet 2.

J. P. BURNHAM.
ART OF DETACHING LINT FROM COTTON SEED HULLS AND OF SEPARATING LINT AND HULLS.

No. 525,691. Patented Sept. 11, 1894.

Witnesses:
Geo. E. Curtis
H. W. Munday

Inventor:
John P. Burnham
By Munday, Evarts & Adcock
his Attorneys.

UNITED STATES PATENT OFFICE.

JOHN P. BURNHAM, OF CHICAGO, ILLINOIS, ASSIGNOR TO WILLIAM B. ALLBRIGHT, OF SAME PLACE.

ART OF DETACHING LINT FROM COTTON-SEED HULLS AND OF SEPARATING LINT AND HULLS.

SPECIFICATION forming part of Letters Patent No. 525,691, dated September 11, 1894.

Application filed May 2, 1892. Serial No. 431,391. (No specimens.)

*To all whom it may concern:*

Be it known that I, JOHN P. BURNHAM, a citizen of the United States, residing in Chicago, in the county of Cook and State of Illinois, have invented a new and useful Improvement in the Art of Detaching Lint from Cotton-Seed Hulls and of separating the Lint and Hulls, of which the following is a specification.

Heretofore various methods or processes and apparatus have been used for treating cotton seed or cotton seed hulls to recover the lint or short cotton fiber adhering thereto; but the methods heretofore in use have generally resulted in more or less injury or destruction to either the lint or the hulls, or to both of said products. The common or most general method heretofore has been to grind up or disintegrate both the hulls and the lint into a meal or powder and then to separate as far as possible the ground hull from the more or less ground fiber.

The lint or short cotton fiber is useful and valuable for paper stock and other purposes; but its utility is largely destroyed if the already short fibers of the lint are further shortened or ground up or destroyed or broken into extremely short particles in the process or method of recovering the same.

The cotton seed hulls are valuable and useful for cattle food; but their utility and value for this purpose are greatly diminished if they are ground into a powder or fine meal in the process of separating the same from the lint; and it is also important that the lint be cleanly removed from the hulls and a perfect separation effected of the lint from the hulls, as the lint not only contains no nutriment, but is detrimental or injurious to the cattle.

The object of my invention is to provide a process or method of treating cotton seed hulls or cotton seed, of a simple nature, which may be practiced or carried out by simple machinery, and whereby the lint or cotton fiber may be rapidly and cheaply detached or removed from the hulls cleanly and perfectly without either on the one hand grinding up, or destroying the fibers of the lint or cotton, or, on the other hand, grinding up, pulverizing or reducing to a meal or powder the hulls; and whereby also the lint and hulls may be separated from each other and the two products delivered into different receptacles. I have discovered that this result of rapidly and cheaply, cleanly and perfectly detaching or removing the lint from the hulls and separating the two products, without grinding up, injuring or destroying either, may be accomplished, and herein my invention consists, by subjecting the cotton seed hulls in a suitable retaining vessel or cylinder simultaneously to two opposing forces or actions, one, a powerful centrifugal action and the other an axial or central air current, the force and size of the axial air current being such in relation to the centrifugal action and in respect to the different specific gravities of the lint and hull—the two products to be detached and separated—that the free particles of lint as they become detached from the hull, being very light and therefore less under the influence of the centrifugal force and keeping nearer the axial center, will be carried away by the air current, while the relatively heavier hulls being more under the influence of the centrifugal action will be forced or kept near the periphery of the vessel or cylinder and will not be carried off by the air current, but discharged through a suitable opening at the circumference of the inclosing chamber, vessel or cylinder. In practicing the invention while the cotton seed hulls are thus being treated they are contained in a suitable inclosing vessel, the same being preferably of cylindrical form and arranged with its axis preferably about horizontal. This vessel or cylinder has a central opening at one end to admit the air, the same also serving as the feed opening, and a central opening at the opposite end to discharge the air, and thus enable an axial or central air current to be produced through the vessel and act upon the material therein. To produce the requisite centrifugal action upon the cotton seed hulls in the vessel, a revolving shaft extends centrally through the same which is furnished with a series of radial blades or wings, preferably arranged in two diametrically opposite rows. The blades extend to nearly the periphery of the inclosing vessel or cylinder and their shaft is revolved at a very high speed, preferably at about two thousand two hundred revolutions per minute so that a rapid rotary motion is communicated thereby to the contents of the cylinder—the air as well as the cotton seed hulls therein. The cylinder or containing vessel is also provided at one side, and preferably on about a level with its axis with a discharge opening through which the clean hulls may pass out. This discharge opening is really a series of small openings each about one-tenth of an inch square, the same being formed by a coarse wire cloth or netting composed, preferably, of steel wire of about No. 10 gage, or about one-tenth of an inch in diameter, the mesh being about one-eighth or one-tenth of an inch. To protect the inner wall of the cylinder against wear and also give it a somewhat roughened or indented surface, this coarse wire netting is preferably extended around the entire periphery of the cylinder. The central or axial air current through the cylinder or containing vessel may be produced by any suitable means, but preferably by a fan connected with the opening at the discharge end of the cylinder.

In practicing the invention the cotton seed hulls are fed into the cylinder in a continuous and regular manner through the inlet opening at one end, and as they enter the cylinder they are immediately subjected to a powerful centrifugal action, and at the same time to that of the central or axial air current, the resultant of the two forces being, as I believe, to a greater or less extent, a kind of spiral, cyclonic, or whirling motion. The cotton seed hulls, as they revolve in the cylinder rub against each other and against the peripheral walls of the cylinder, against which and each other they are pressed by the centrifugal force and by the pressure of the spirally revolving column of air in the cylinder, and thus the lint is detached therefrom; and the lint, by reason of its less specific gravity than the hulls, tends to remain nearer the central shaft in the cylinder, and is thus caught and carried away by the axial or central air current; and the cleaner or freer from lint the hulls become during the process, the more subject they become to the centrifugal action, so that this centrifugal action thus keeps separating the cleaner hulls from those less clean, and these latter from those still less clean, and so on, so that the perfectly clean hulls keep seeking the exterior or periphery of the inclosing cylinder or vessel where they may be and finally are discharged as they pass over or are brought opposite to the discharge openings. Under or by the conjoint action of the centrifugal force and the central or axial air current the cotton seed hulls or material in the cylinder are or is also slowly carried from the feed end to the discharge end of the cylinder, and by this means the material in the cylinder is distributed throughout the length of the cylinder as it is carried around its periphery by the rapid revolving or spiral movement.

In practicing the invention it is important that the force of the central air current should be properly proportioned in respect to the centrifugal action and to the relative specific gravities of the two products to be detached from each other and separated. If the force of the central air current, for example, is made too powerful it would overcome the centrifugal force and cause the hulls as well as the lint to be discharged together at the end of the cylinder and without detaching the lint from the hulls; and if, on the other hand, the centrifugal action or force be not great enough or the speed of revolution too slow, the lint will not be centrifugally separated from the hulls by the centrifugal action; and the operation would resolve itself more or less into the nature of a simple stirring, mixing, beating or grinding operation, resulting finally in a destruction of both the hulls and the lint, and the discharge of both together at the periphery of the cylinder; and if the force of the central air current be too slight the freed lint will not be carried away thereby as it is detached from the hulls and will remain in the cylinder to impede or interfere with the operation on the fresh material fed into the cylinder and such lint would itself in time be more or less destroyed.

An important principle or feature of my process is the almost instantaneous separation or removal of the freed lint from the hulls by the centrifugal action the moment it is detached therefrom and its simultaneous removal from the cylinder by the action of the central air current.

While my invention may be practiced with any suitable apparatus or mechanism capable of subjecting the cotton seed hulls to the peculiar treatment or process hereinbefore described, it will aid materially the full and clear understanding of the same, its nature and principle, to show and explain the apparatus.

I have therefore in the accompanying drawings which form a part of this specification shown one suitable form of apparatus for practicing my improved process, the apparatus shown being that which I have heretofore used with success for the purpose; and in connection with the drawings I will state approximately the dimensions and speed of the several operative parts, so that those skilled in the art will have no difficulty in practicing the invention from the description herein contained.

In the drawings similar letters of reference indicate like parts throughout all the figures.

Figure 6:
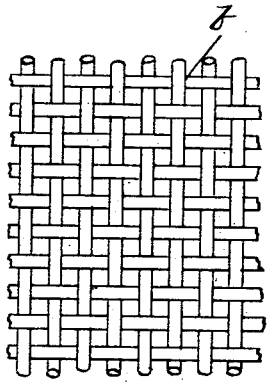
Figure 7:
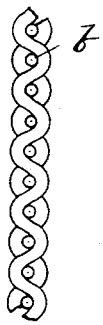
Figure 8:
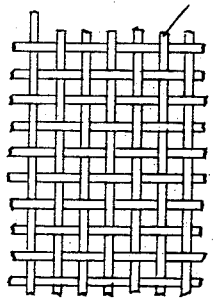

In said drawings Figure 1 is a central horizontal section through the containing vessel or cylinder. Figs. 2 and 3 are vertical cross sections on lines 2—2 and 3—3 of Fig. 1, respectively. Fig. 4 is a detail elevation of the cylinder showing the discharge opening through which the cleaned hulls pass out. Fig. 5 is a central vertical longitudinal section. Fig. 6 is a detail face view, (full size in the original or unreduced drawing,) of the coarse wire netting with which the cylinder or containing vessel is lined on the inside all around its periphery as well as at the discharge openings for the hulls. Fig. 7 is a section or edge view of this netting shown in Fig. 6. Fig. 8 is a plan view showing the wire screen forming the bottom of the returning trough.

In the drawings A represents the frame and B the containing vessel or cylinder secured to the stationary frame. This cylinder B has central openings $B'$ $B^2$ in its heads $B^3$ $B^4$, the openings being materially less in diameter than the cylinder so that the annular head $B^4$ of the cylinder makes a ring or ledge at the discharge end of the cylinder to contract the diameter of the central air current and prevent the discharge of the hulls or heavier particles at this central opening.

The periphery of the cylinder B is preferably formed of sheet metal and lined on the inside with coarse wire netting $b$ formed of steel wire of about No. 10 gage and with about one-eighth inch mesh.

C is a feed chamber at the feed end of the cylinder, the same communicating with the central feed opening $B'$ in the head $B^3$ of the cylinder.

D is a fan chamber or shell at the opposite or discharge end of the cylinder, the same communicating with the discharge opening $B^2$ of the cylinder.

E is a revolving shaft, centrally extending through the cylinder and journaled in suitable bearings $E'$ on the frame of the machine. The shaft E extends out through the head or end $C'$ of the feed chamber C, and head $D'$ of the fan chamber or shell D. It is furnished with a driving pulley $E^2$ at one end, and a small pulley $E^3$ at the other end, the latter for a purpose hereinafter to be described. The shaft E is furnished, in the cylinder B, with a series of radial blades F arranged preferably in two diametrically opposite rows with spaces or intervals $F'$ between the individual blades somewhat wider than the blades. The blades F are made of steel, and are preferably somewhat fan shaped, as indicated in the drawings. The fan chamber D is preferably located in line with the cylinder B, so that the fan G or its blades may be secured to or operated by the same shaft E.

H is a return trough secured to the frame opposite the discharge opening $B^5$ for the hulls and furnished with a screen bottom $h$, the same being made preferably of about No. 18 wire and one-eighth inch mesh. This trough is closed at the top by a cover $H'$ and has revolving in it a beater or picker shaft K furnished with teeth or pickers $k$ arranged spirally, about as indicated in the drawings, so that the same will operate to convey the material in this return trough back to the feed end of the cylinder B.

Opposite the feed chamber C the picker shaft K is furnished with blades $k'$ and the feed chamber C is furnished with an opening $c$ through which the hulls that still have some lint attached to them, and which consequently do not pass through the screen $h$ of the trough H, may be thrown back into the feed chamber C. The picker shaft K is journaled in suitable bearings $K'$ on the frame of the machine and is driven from the pulley $E^3$ by a belt $K^2$ which passes around the pulley $K^3$ on the shaft K.

In the machine which I have chosen to represent in the drawings, the cylinder B is twenty inches long and twelve and one-half inches in diameter, this being the interior dimensions. The discharge opening $B^2$ in the head $B^4$ is eight inches in diameter and the inlet or feed opening is of about the same diameter. The fan shell or case D is about thirteen inches in diameter and four inches long, and the fan blades are four in number and fit approximately the interior of the fan case or shell, excepting that they do not extend quite to the shaft, as is clearly indicated in the drawings. With these, or approximately these dimensions the speed of the revolving shaft E should be about two thousand two hundred revolutions per minute, although this speed may vary materially; but it is better that the speed should not exceed two thousand five hundred nor fall much below two thousand revolutions per minute, by changing the relative dimensions of the parts, the speed or revolutions may then also be varied.

The picker shaft K should preferably be driven at about two hundred revolutions per minute. The exit passage or pipe $D^2$ from the fan is preferably about four by five inches in cross section, and it is or should be provided with a damper or valve $d$ to regulate the volume and force of the air current. This exit pipe or passage $D^2$ leads to a room or receptacle for collecting and holding the freed lint discharged from the machine. This collecting room should of course have large exit openings for the air closed by cloth to prevent the escape of the lint. The inlet passage or pipe $C^2$ leading into the feed chamber in the machine shown in the drawings is four by five in cross section.

It will of course be understood that the form and dimensions above set forth as well as the velocity or speed of revolution stated simply apply to the particular machine represented in the drawings; and that the same also is suitable for use when operating upon the particular material named, to wit: cotton seed hulls. For operating upon other materials, or when using machines of other forms or dimensions, variations will or may be necessary to produce the desired result.

The head $B^4$ of the cylinder is or should be furnished with an inwardly projecting flange $b'$ at the central or annular discharge opening $B^2$ as this will serve to aid somewhat the centrifugal separation of the lint and hulls and tend to prevent any portion of the hulls being carried out by the air with the lint.

The purpose of the revolving shaft E and its blades or wings F is to impart the requisite centrifugal or revolving movement to the air and hulls in the cylinder, and not to act as an inside or opposing grinder to the peripheral wall of the cylinder, and for this reason the extreme edges of the blades are made thin so as to present a mere edge and no appreciable peripheral surface to the inner periphery of the wall or cylinder.

In the practical operation of my process the spirally revolving column of air in the cylinder may be supposed to act or serve somewhat in the nature of an opposing revolving surface to the peripheral surface of the cylinder B, or such column of air when taken in connection with the hulls carried around with and by it. The peripheral wall of the cylinder B in connection with the hulls themselves acting upon each other and the air revolving with and carrying the hulls are in my invention the sole rubbing agencies or surfaces tending to detach the lint from the hulls, and it is for this reason in part when taken in connection with the immediate removal of the separated lint from the cylinder that I am enabled to detach, remove and separate the lint from the hulls without destroying or grinding up either the hulls or the lint. While this explanation of the theory or action of the invention may not be in all respects correct, it is nevertheless what I believe and am led to believe from my experiments to be the correct explanation.

While in describing my invention I have spoken of the use of an air current in conjunction with the centrifugal action, it will of course be understood by those skilled in the art that a current of other fluid besides air may be employed as the equivalent for the air current.

I claim—

1. The process herein described of detaching the adhering lint from cotton seed hulls and separating the lint from the hulls consisting in subjecting such cotton seed hulls in an inclosing chamber simultaneously to a powerful centrifugal or rapidly revolving action, substantially as described, and to a central or axial air current whereby the adhering lint is detached from the hulls and the cleaned hulls and lint separated from each other, substantially as specified.

2. The improvement in the art of detaching adhering lint from cotton seed or cotton seed hulls without destroying or grinding up either the hulls or the lint, the same consisting in subjecting such hulls or seed in an inclosing chamber to a powerful centrifugal or revolving action, substantially as described, and simultaneously forcing a current of air of less diameter than the chamber centrally through said chamber, said centrifugal or revolving action serving to detach the adhering lint from the hulls or seed and, in connection with the air current, to separate the lint from the hulls or seed as it is detached, and the central air current serving to carry away the detached and separated lint, substantially as specified.

3. The improvement in the art of detaching and separating from each other two or more adhering substances of different specific gravities, consisting in subjecting said adhering substances in an inclosing chamber to a powerful centrifugal or rapidly revolving action, substantially as described, and simultaneously forcing a current of air centrally through said chamber, said air current as it issues from said chamber being of less diameter than the chamber, whereby the lighter adhering substance is separated from the heavier by said powerful centrifugal action and simultaneously carried away or removed by the central air current, substantially as specified.

JOHN P. BURNHAM.

Witnesses:
H. M. MUNDAY,
LEW. E. CURTIS.